United States Patent

Brito et al.

[11] Patent Number: 6,040,671
[45] Date of Patent: Mar. 21, 2000

[54] CONSTANT VELOCITY CONTROL FOR AN ACTUATOR USING SAMPLED BACK EMF CONTROL

[75] Inventors: Joao Carlos F. Brito, Richardson; John K. Rote, Dallas; Frederick W. Trafton, Lewisville; Marcus M. Martins, Richardson, all of Tex.

[73] Assignee: Texas Instruments Incorporated, Dallas, Tex.

[21] Appl. No.: 09/239,188

[22] Filed: Jan. 28, 1999

[51] Int. Cl.[7] .............................. H02K 23/00; H02P 1/04
[52] U.S. Cl. .......................... 318/603; 318/254; 318/439; 318/806; 318/430; 318/805; 388/912; 388/928.1
[58] Field of Search .................................... 318/430–434, 318/254, 439, 138, 798–817, 566, 568.18, 568.22, 603; 388/804–806, 811–815, 819–823, 912, 928.1

[56] References Cited

U.S. PATENT DOCUMENTS

| | | | |
|---|---|---|---|
| 5,592,058 | 1/1997 | Archer et al. | 318/254 |
| 5,623,379 | 4/1997 | Nishimura et al. | 360/74.1 |
| 5,731,670 | 3/1998 | Galbiati et al. | 318/254 |
| 5,767,654 | 6/1998 | Menegoli et al. | 318/811 |
| 5,889,629 | 3/1999 | Patton, III | 360/75 |
| 5,965,992 | 10/1999 | Goretzki et al. | 318/254 |

*Primary Examiner*—Brian Sircus
*Attorney, Agent, or Firm*—J. Dennis Moore; Wade James Brady, III; Richard L. Donaldson

[57] ABSTRACT

An apparatus for controlling an actuator having a moveable member and having a coil that influences movement of the member, by provision of a drive current to the coil in response to a target speed voltage signal. The invention includes an up/down counter, counting at a predetermined count rate and providing a count output. A control unit is provided for controlling the direction of count of the up/down counter depending on whether the voltage across the coil, sensed periodically a first predetermined interval after the drive current to the coil is interrupted, is greater than, or less than, a reference voltage having a predetermined relationship to the target speed voltage. A digital-to-analog converter is provided, responsive to the count output to provide a compensated voltage signal having a voltage corresponding to the count output. A voltage sensing and holding unit is provided that periodically, after the drive current is interrupted for a second predetermined interval, senses and holds a sample voltage corresponding to the voltage across the coil. A plus/minus indicator is provided that senses when the up/down counter is in a down count direction and is at a count of zero, and in response thereto changes between a plus state and a minus state. A switch node is provided, combining the sample voltage signal with the compensated voltage signal to produce a command voltage signal, and providing the command voltage signal with a polarity controlled by the state of the plus/minus indicator. Finally, a transconductance amplifier unit is provided, receiving the command voltage signal and providing the drive current to the coil in a direction determined by the state of the plus/minus indicator.

10 Claims, 3 Drawing Sheets

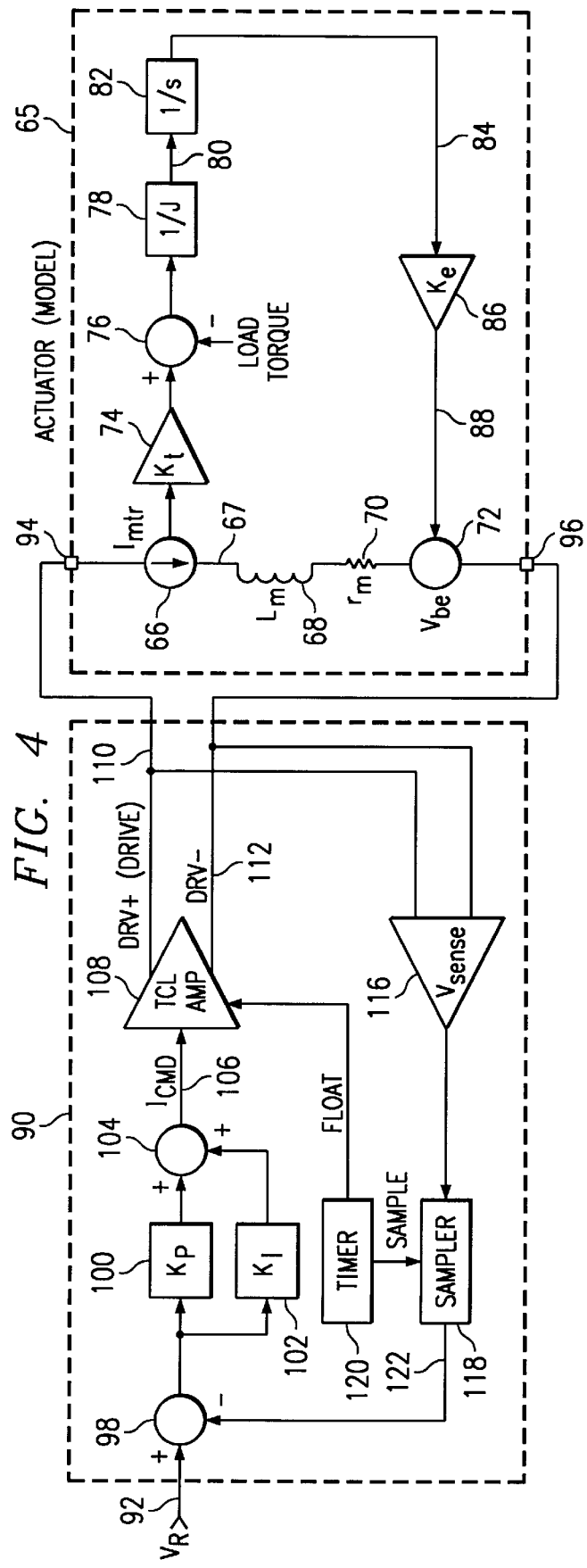
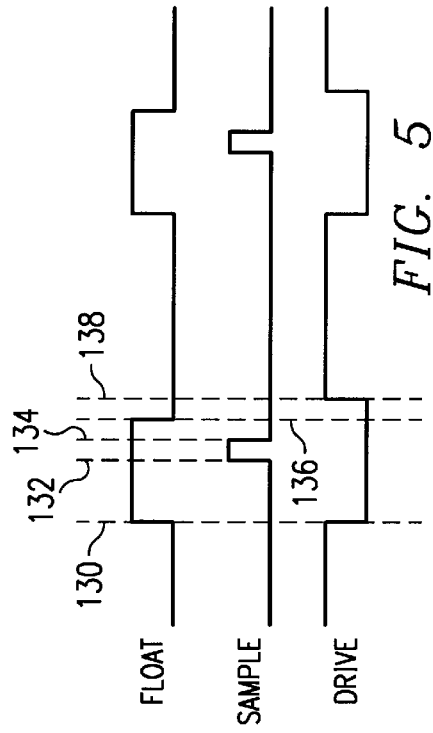

CONSTANT VELOCITY CONTROL FOR AN ACTUATOR USING SAMPLED BACK EMF CONTROL

TECHNICAL FIELD OF THE INVENTION

The present invention relates in general to control of an actuator and, more particularly, to a method and apparatus for accurately controlling the velocity of an actuator member by monitoring the back electromotive force ("EMF") of an actuator coil.

BACKGROUND OF THE INVENTION

Conventional actuators, sometimes referred to as "motors", have a movably supported member, and a coil. When a current is passed through the coil, a motive force is exerted on the member. A control circuit is coupled to the coil in order to controllably supply current to the coil. One example of such an arrangement is found in a hard disk drive, where the movable member of the actuator supports a read/write head adjacent a rotating magnetic disk for approximately radial movement of the head relative to the disk. There are situations in which it is desirable to move the member to one end of its path of travel at a predetermined velocity which is less than its maximum velocity. An example of such a situation is a power failure. In such a situation, it is desirable to move the member to a parking location, where it is held against potentially damaging movement which could When a current is applied to the coil of the actuator, the member is subjected to a force tending to accelerate the member at a rate defined by the magnitude of the current, and in a direction defined by the polarity of the current. Consequently, in order to accelerate or decelerate the member until it is moving at a desired velocity and in a desired direction, it is important to know the actual direction and velocity of the member. In this regard, it is known that the back-EMF voltage on the coil of the actuator is representative of the velocity and direction of movement of the member. Specifically, the following relationship applies to actuators:

$$V_M = I_M * R_M + K_e \omega$$

where:

$V_M$=voltage across actuator (motor), $I_M$=current through actuator, $R_M$=internal resistance of actuator, $K_e$=torque constant of actuator, and $\omega$=velocity of actuator. The term, $K_e\omega$, represents the back-EMF of the actuator coil.

It is desired to have a control circuit for an actuator that accurately monitors the back-EMF of the actuator coil and effectively controls the movement of the actuator member under widely varying load conditions, so as to, for example, permit the control parking of a disk drive member throughout the path of its travel. Further, it is desired to have such a control circuit that is implemented with a minimum of circuitry so as to maintain the incremental cost of such a control circuit at an acceptably low level.

SUMMARY OF THE INVENTION

In accordance with the present invention there is provided an apparatus for controlling an actuator having a moveable member and having a coil that influences movement of the member, by provision of a drive current to the coil in response to a target speed voltage signal. The invention includes an up/down counter, counting at a predetermined count rate and providing a count output. A control unit is provided for controlling the direction of count of the up/down counter depending on whether the voltage across the coil, sensed periodically a first predetermined interval after the drive current to the coil is interrupted, is greater than, or less than, a reference voltage having a predetermined relationship to the target speed voltage. A digital-to-analog converter is provided, responsive to the count output to provide a compensated voltage signal having a voltage corresponding to the count output. A voltage sensing and holding unit is provided that periodically, after the drive current is interrupted for a second predetermined interval, senses and holds a sample voltage corresponding to the voltage across the coil. A plus/minus indicator is provided that senses when the up/down counter is in a down count direction and is at a count of zero, and in response thereto changes between a plus state and a minus state. A switch node is provided, combining the sample voltage signal with the compensated voltage signal to produce a command voltage signal, and providing the command voltage signal with a polarity controlled by the state of the plus/minus indicator. Finally, a transconductance amplifier unit is provided, receiving the command voltage signal and providing the drive current to the coil in a direction determined by the state of the plus/minus indicator.

These and other features of the invention will be apparent to those skilled in the art from the following detailed description of the invention, taken together with the accompanying drawings.

DESCRIPTION OF THE DRAWINGS

FIG. 4 is a high level diagram of a preferred embodiment of the present invention.

FIG. 5 is a timing diagram of signals used in the circuit of FIG. 4.

DESCRIPTION OF PREFERRED EMBODIMENTS OF THE PRESENT INVENTION

Figure 1:
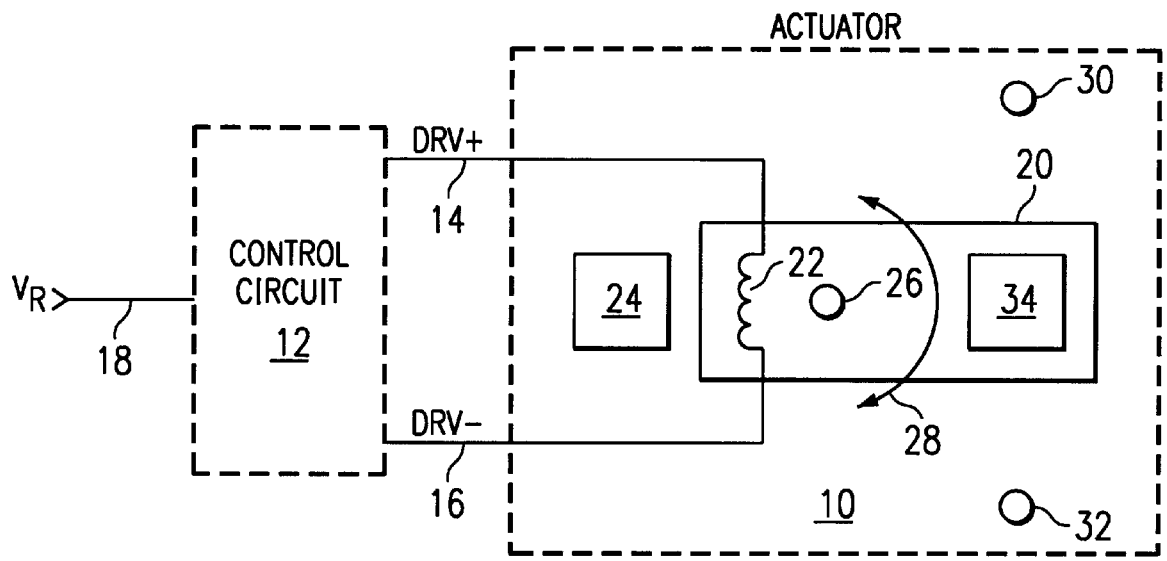
FIG. 1 is a high level block diagram of a control circuit and an actuator.

FIG. 1 is a diagrammatic view of a system including an actuator 10 under control of a control circuit 12 which applies drive signals DRV+ on line 14 and DRV− on line 16 in response to a retract command voltage signal $V_R$ on line 18. The drive signals DRV+ and DRV− cause motion in a member 20 of actuator 10 by setting up a force field in a coil 22 on the member 20. The force field thus set up in coil 22 interacts with the magnetic field of a permanent magnet 24 disposed nearby. Member 20 is constrained to move about a shaft 26, resulting in pivoting motion as shown by arrow 28. The member is constrained in its movement between a first stop 30 and a second stop 32. The result is that a magnetic head 34 is caused to move about a magnetic disk (not shown in this figure) in conjunction with the reading and writing of data from and to the magnetic disk in a hard drive system.

Figure 2:
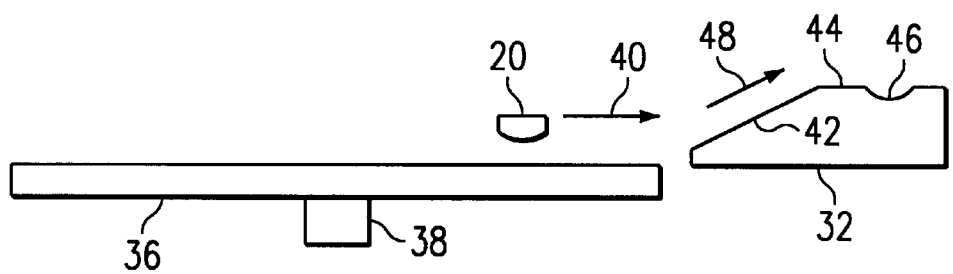
FIG. 2 is a cross sectional sketch showing a hard drive disk, actuator member and parking ramp for the actuator member.

FIG. 2 is a cross sectional view of pertinent components of a hard drive system in which an actuator system such as that described above in connection with FIG. 1 may be used. A magnetic disk 36 rotates about a spindle 38. A member 20, carrying a magnetic head (not shown) moves across the disk 36 in read/write operations. In a controlled retract operation, the member 20 is caused to move across the disk outwardly as shown by arrow 40 in the direction of one of the stops, in this case stop 32. Stop 32 has a generally ramplike configuration, including a ramp surface 42. At the top of the ramp surface 42 is a horizontal surface 44 sometimes referred to as the "porch", in which a small detent 46 is formed. In the retract operation the member 20 proceeds in a path across the disk 36, up the ramp surface 42 as shown by arrow 48, across the porch 44 to the detent 46 where the member 20 is held against potentially damaging movement.

Figure 3:
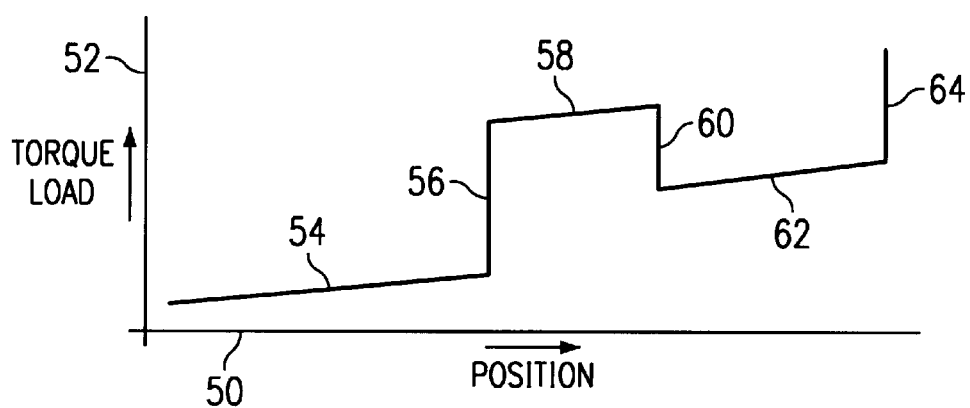
FIG. 3 is a graph of torque load versus position for a retract operation of a hard disk drive actuator member.

The torque load experienced by the member 20 as it traverses along the retract path described above in connection with FIG. 2 changes with the position of the member 20. This is illustrated in FIG. 3. FIG. 3 is a graph in which the horizontal axis 50 represents the position of the member 20 (FIG. 2) while the vertical axis 52 represents the torque load to which the member 20 is subjected as it traverses the path in a retract operation. As the member 20 moves across the surface of the disk 36 (FIG. 2) a small but steadily increasing torque load is encountered by the member 20 as shown by line 54 in FIG. 3. When the member 20 encounters the ramp surface 42, it experiences a sharp increase in the torque load, as shown by line 56 in FIG. 3. As the member 20 travels up the ramp it experiences a steadily increasing torque load, as shown by line 58. At the top of the ramp the member 20 encounters the horizontal porch surface 44 resulting in an abrupt drop in the torque load, as shown by line 60 in FIG. 3. As the member traverses across the porch surface 44, the member 20 experiences a steadily increasing torque load, as shown by line 62 in FIG. 3. Finally, the member 20 lodges in the detent 46, resulting in a sharp increase in torque load, as shown by line 64 in FIG. 3.

It will be appreciated from an inspection of the curve shown in the graph of FIG. 3 that the torque load encountered by the member 20 as it traverses its path in a retract operation varies considerably with position. The control circuit 12 (FIG. 1) controlling such a retract operation must, therefore, be able to provide the desired relatively constant velocity movement of the head 20, in the face of such a widely varying torque load. Further, this controlled and constant velocity must by provided in situations where the supply voltage is in the process of a steady decay to zero, such as a power failure, for a sufficient duration to permit completion of the retract operation. The present invention provides just such a control circuit.

FIG. 4 is a high level block diagram of a preferred embodiment of the present invention. A control circuit 90 receives a retract command signal $V_R$ on line 92 and provides drive current DRV+ and DRV− to an actuator. In FIG. 4 the actuator shown is an idealized model 65 of an actuator. It will be appreciated that the control circuit 90 is unable to "see" a significant difference between the actuator model 65 and an actual actuator, where an actual actuator connected to control circuit 90.

The actuator model 65 includes an ideal current sensor 66, an inductance 68, a resistance 70 and an ideal voltage-controlled voltage source 72, all coupled in series between the two terminals 94, 96 of the actuator model 65. The output 67 of the ideal current sensor 66 is a signal representing the current flowing through the actuator. This signal 67 is coupled to an input of an amplifier 74, which has a gain $K_t$ that represents a torque constant of the moveable member 20 (FIG. 1). The output of the amplifier 74 is coupled to the input of a junction 76, which adjusts the amplifier output using a signal representing a load torque. The output of junction 76 is coupled to the input of a circuit 78, which makes an adjustment representative of the inertia J, of the member 20.

The output 80 of the circuit 78 is a signal which represents an acceleration of the member 20. The signal 80 is integrated at 82, in order to obtain a signal 84 which represents the velocity of the member 20. The signal 84 is applied to the input of an amplifier 86 having a gain $K_e$ that represents an electrical constant for the back-electromotive force (EMF) of the actuator. The output 88 of the amplifier 86 is a voltage $V_{be}$ which represents the back-EMF voltage of the actuator. This voltage is applied to an input of the ideal voltage-controlled voltage source 72, which reproduces this same voltage $V_{be}$ across its output terminals. Since the voltage source 72 is ideal, it produces the output voltage regardless of whether there is any current flowing through source 72.

Since the signal 84 represents the actual velocity of the member 20, and since the back-EMV voltage $V_{be}$ present at 88 and across source 72 is proportional to the magnitude of signal 84, it will be appreciated at the magnitude of the back-EMF voltage $V_{be}$ across source 72 is an accurate representation of the actual velocity of the member 20. However, when a current is flowing through the actuator model 65, the resistance 70 produces a voltage which is added to the voltage $V_{be}$ across the voltage source 72. Consequently, so long as current is flowing through the actuator model 65, it is not possible to accurately measure the voltage $V_{be}$ alone, in order to accurately determine the actual velocity of the movable member.

Therefore, the present invention independently measures the back-EMF voltage $V_{be}$, and thus determines the actual velocity of the member 20. It does this by interrupting the current flow through the actuator coil 68 so that the voltage across the resistance 70 goes substantially to zero, after which the back-EMF voltage $V_{be}$ is measured across the two terminals 94, 96, of the actuator model 65. It is a characteristic of the actuator that the back-EMF voltage $V_{be}$ does not change rapidly after the current flow through the actuator model 65 is decreased to zero, once short term transient effects have died down.

The control circuit 90 includes the following components. A junction 98 receives the retract command voltage signal $V_R$ on line 92 that corresponds to a target velocity for the actuator member 20. The output of junction 98 is provided to a proportional compensation unit 100 that provides a proportional amplification to the input provided thereto. Thus, the output of unit 100 is some multiple of the input, i.e., unit 100 is substantially a linear amplifier. However, it will be appreciated that the proportional factor in unit 100 may be one, in which case the output would be the same as the input. The output of terminal 98 is also provided to an integral compensation unit 102, which provides a mathematical integration operation on its input to derive its output. The output of unit 100 provided to one input of terminal 104, while the output of unit 102 is provided to another input of terminal 104. The output of units 100 and 102 are added in terminal 104, and the output, which is a voltage the level of which represents a commanded current level, $I_{CMD}$, is provided on line 106 to a transconductance linear amplifier 108. The outputs of amplifier 108 are the differential drive currents DRV+ and DRV− which are provided on lines 110 and 112, respectively. The DRV+ signal is synchronous with a DRIVE control signal described below. Lines 110 and 112 are provided to input terminals 94 and 96, respectively, of the actuator model 65. Lines 110 and 112 are also connected to the differential inputs of a voltage sense unit 116. The output of the voltage sense unit 116 is provided to a sampler unit 118. A timer 120 generates two timing signals, a FLOAT timing signal which is applied to transconductance amplifier 108 and a SAMPLE timing signal which is applied to sampler unit 118. The output of sampler unit 118, on line 122 is provided to a second input to terminal 98. The signal on line 122 is subtracted from the signal on line 92 in terminal 98.

The operation of the control circuit 90 of FIG. 4 may be better understood by reference to the signal timing diagram shown in FIG. 5. FIG. 5 shows the FLOAT timing signal, the SAMPLE timing signal, and the DRIVE drive signal, all mentioned above. These three signals are presented along a common horizontal time axis, and so their relative timings may be easily seen. As can be seen in FIG. 5, the FLOAT signal is a regularly recurring rectangular pulse. Looking now at one set of pulse signals, at timing 130 the FLOAT signal begins. This causes amplifier 108 (FIG. 4) to turn off the drive signals, as can be seen by looking at the signal DRIVE in FIG. 5. After sufficient time for the transient effects in inductor 68 (FIG. 4) of the actuator to die down, at timing 132, a SAMPLE pulse begins. A SAMPLE pulse is provided for a sufficiently long period of time to enable the sampler unit 118 (FIG. 4) to sense the voltage at the output of amplifier 116. At time 134 the SAMPLE pulse ceases. After a small delay, at time 136, the FLOAT signal ends. A short time thereafter, at time 138, the drive signals resume. The sequence thus described repeats regularly. Details of the timings of these signals are provided below, in connection with the description of FIG. 6.

Thus, in operation, the command voltage $V_R$ is provided on line 92 to terminal 98. There, it is combined with a voltage on line 122, which is described in detail below. The output of terminal 98 is provided to the proportional compensation unit 100 and integral compensation unit 102, the outputs of which are combined in terminal 104 to yield the current command signal $I_{CMD}$. The current command signal $I_{CMD}$ is converted into actual drive currents by the transconductance amplifier 108, to yield the drive currents DRV+ and DRV− which are applied to the terminals 94 and 96, respectively, on the actuator model 65. At the same time, the voltage across terminals 94 and 96 is sensed by voltage sense unit 116. The timer unit 120 applies the FLOAT signal to amplifier 108, thus interrupting the drive current, a short time after which the SAMPLE signal is provided to sampler unit 118, which samples and stores the voltage output from voltage sense unit 116, thus the back-EMF voltage, undisturbed by voltage effects produced by the application of the drive currents, is sensed and stored in the sampler unit 118 on a regularly occurring basis. This sampled and held voltage is provided on line 122 to the terminal 98 where it is subtracted from the command voltage VCMD to yield a feedback-corrected control voltage.

The feedback-corrected command voltage is then applied to the proportional compensation unit 100 and the integral compensation unit 102. As mentioned above, the proportional compensation unit 100 provides an output that is some multiple of its input. This multiple may be unity. The purpose of the proportional compensation unit 100 is to shape $I_{CMD}$ so as to enable the control circuit 90 to respond better to large errors in the actual velocity, as compared with the desired, commanded velocity, while ensuring stability in the control circuit 90. This is desired because, for example, in a retract operation, the situation in which the retract is initiated may be in the middle of a hard drive "hard seek" operation. In a hard seek the actuator coil is driven to the point of maximum velocity so as to rapidly move the head to a desired track on the hard drive. The voltage corresponding to this velocity might be, say, 7 Volts. By contrast, an exemplary voltage corresponding to a desired retract operation speed may be, say, one volt. The proportional compensation unit 100 allows the control circuit 90 to respond to this wide disparity between actual speed and desired speed, without destabilizing the system. In selecting a suitable value for the proportional amplification factor, the practitioner should keep stability foremost, and set a bandwidth that is significantly less than the frequency of the SAMPLE signal pulses, while providing allowing relatively quick control of the actuator.

The integral compensation unit 102, as mentioned above, provides a mathematical integration operation on its input to derive its output. Thus, its response is slower than the proportional compensation unit 100, and is unsuitable for reliance to respond to large errors in velocity, such as described above. This is why the proportional compensation unit 100 is provided. However, the proportional compensation unit 100 is not optimal for response to large changes in the torque load the actuator member may encounter. In such situations, the proportional compensation unit 100 is inadequate to maintain the desired relatively constant velocity. By contrast, the integral compensation unit 102 does respond well to even large and abrupt changes in torque load, such as are found in the retract operation, as discussed above in connection with FIG. 3. When such a large torque load change is encountered, the integral compensation unit 102 gradually integrates the change in resultant velocity that the torque load change is inducing, and steadily increases the compensating current command to maintain the velocity constant. The result is adequate magnitude compensating current command, without destabilization of the control circuit 90.

Figure 6:
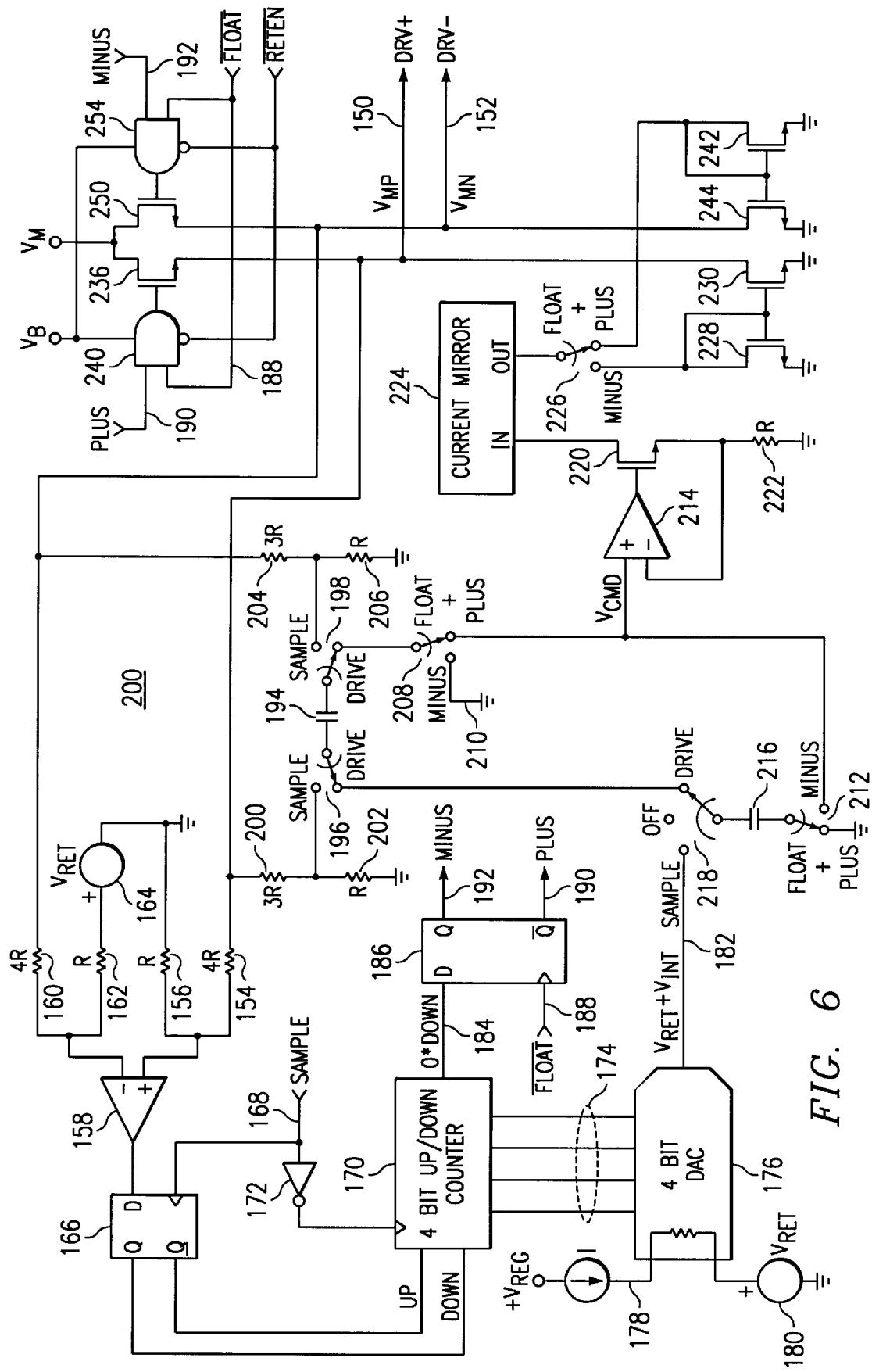
FIG. 6 is a circuit diagram of a preferred embodiment of the present invention.

FIG. 6 is a circuit diagram of a preferred embodiment of the present invention. The circuit shown in FIG. 6 incorporates the features discussed above in conjunction with FIG. 4. Furthermore, the circuit shown in FIG. 6 presents an implementation that includes several novel and highly advantageous features, as will be apparent from the description that follows. Specifically, a novel up/down counter and digital-to-analog converter arrangement, combined with a novel switched capacitor arrangement, provide a highly effective implementation of the control circuit 90 of FIG. 4, in very few components. This permits the circuit of FIG. 6, for example, to be used as a stand-alone circuit not otherwise integrated with other control circuitry in a hard drive system, so as to provide a precise head retract subsystem in affordable implementation.

In addition, the circuit of FIG. 6 incorporates several novel features permitting its use in situations where the supply voltage is in the process of a decay to zero, such as in a power failure. Even in such situations, the circuit of FIG. 6 will provide the necessary control for a relatively constant velocity retract of a hard drive head, long enough to complete the retract operation.

Turning now to FIG. 6, a control circuit 200 is shown for an actuator (not shown in this figure). First, the components making up control circuit 200 will be described. Then, the principles of operation will be described.

Two output lines 150 and 152 provide drive currents DRV+ and DRV−, respectively. Output line 150 is connected to one end of a resistor 154, having a value of 4R, where R is a resistance value of, for example, 1kΩ. Resistor 154 is connected in series with a resistor 156, having a value of R, to ground. The common connection node of resistor 154 and resistor 156 is connected to a plus input of a comparator 158.

Output line 152 is connected to one end of a resistor 160, having a value of 4R. Resistor 160 is connected to one end of a resistor 162, having a value of R, the other end of which is connected to a plus side of a voltage source 164 of a magnitude $V_{RET}$. In this embodiment $V_{RET}$ represents the target back-EMF voltage that appears at output lines 150 and 152 when the desired retraction velocity is achieved, divided by four. The reason the voltage corresponding to the desired retraction velocity is reduced by a factor of four, is to allow a reference voltage of $V_{RET}$ to be set to 250 millivolts, rather than the one volt command voltage required for the desired retraction speed. This reference voltage is small enough so that it may be maintained for the entire duration of a retract after a power failure, as the system voltage is decaying to zero. A conventional low voltage regulator circuit may be used to establish this, and other reference voltages described below. If desired, $V_{RET}$ could be the same as the voltage corresponding to the desired retraction velocity, in which case voltage dividers would be unnecessary.

The negative side of voltage source 164 is connected to ground. Thus, resistor 160, resistor 162 and voltage source 164 are connected in series between line 152 and ground. The common connection node of resistor 160 and resistor 162 is connected to a minus input of comparator 158. Resistors 160 and 162 form a ¼ voltage divider, as do resistors 154 and 156. The voltage $V_{RET}$ is, as mentioned above, ¼ the desired back-EMF voltage for the commanded retract speed. Thus, at the input of comparator 158 a comparison is performed to determine whether the voltage $V_{MP}$ at line 150, relative to the voltage $V_{MN}$ at line 152, is above, or below, the desired back-EMF voltage, that is, 4·$V_{RET}$. If it is above, then the output of comparator 158 will be driven high; if it is below, then the output of comparator 158 will be driven low.

The output of comparator 158 is connected to the D input of a latch 166. The output state of comparator 158 is captured periodically in latch 166, in response to a SAMPLE signal provided at input 168 to latch 166. The captured state is provided as Q and $\overline{Q}$ outputs of latch 166. These outputs are provided as inputs to a four bit up/down counter 170, with the Q output of latch 166 providing the DOWN input to counter 170, and the $\overline{Q}$ output of latch 166 providing the UP input to counter 170. Thus, counter 170 counts either up or down under control of the state captured in latch 166.

The SAMPLE signal on input 168 is inverted by inverter 172, and the inverted SAMPLE signal is provided to the rising-edge-triggered count input of counter 170, thus causing counts of counter 170 at the falling edges of the SAMPLE signal pulses.

The four bit output 174 of counter 170 is provided to the four bit input of a four bit digital-to-analog converter ("DAC") 176. The DAC 176 converts the digitized value at its four bit input to an analog voltage, in this case a voltage $V_{INT}$ representing a mathematical integral of the difference of the voltage on line 150, with respect to the voltage on line 152, as is described in more detail below. The DAC 176 receives a regulated voltage $V_{REG}$ and a reference current I on line 178. The output of the DAC 176, provided on line 182, is a voltage at $V_{INT}$, plus an offset $V_{RET}$ provided by voltage source 180.

The four bit up/down counter 170 has conventional logic circuitry included with it to permit it to detect when it has a count value of zero and it is in DOWN count mode. When such a condition occurs counter 170 provides an output signal on line 184, which is provided to the D input of latch 186. The value of the signal on line 184 is captured in latch 186 by the rising edge of the $\overline{\text{FLOAT}}$ signal (the falling edge of the FLOAT signal), provided on input line 188. The $\overline{Q}$ output of latch 186 is a PLUS signal, and is provided on line 190, while the Q output of latch 186 is a MINUS signal, and is provided on line 192. The PLUS and MINUS signals are used in a manner described below.

The value of the voltage difference between lines 150 and 152 is also sampled, by a capacitor 194. The capacitor 194 is connected at one port to the common port of a switch 196 and at the other port to the common port of a switch 198. Both switches 196, 198, are single-pole-double-throw, and switch in unison from a DRIVE position to a SAMPLE position, in response to the SAMPLE signal, and return to the DRIVE position when the SAMPLE signal is removed. Both switches 196, 198, are shown in the DRIVE position in the figure. All other switches in FIG. 6 are also single-pole-double-throw, except for switch 218, described below, which is a three-position-single-pole switch. All switches may be implemented as a pair of FETs, with the signal identifying the switch position in FIG. 6 being provided to the gate of the respective FET for enablement of that switch position. Note that switch 218 is also a pair of FETs, with the third, OFF "position" being the consequence of the fact that the SAMPLE and DRIVE signals do not completely overlap, as shown in FIG. 5.

The SAMPLE position port of switch 196 is connected to the common connection node of two resistors, a resistor 200 and a resistor 202. The other end of resistor 200 is connected to line 150, while the other end of resistor 202 is connected to ground. The value of resistor 200 is three times the value of resistor 202, thus forming a ¼ voltage divider of the voltage $V_{MP}$ on line 150, which is seen by the common port of switch 196.

The SAMPLE position port of switch 198 is connected to the common connection node of two resistors, a resistor 204 and a resistor 206. The other end of resistor 204 is connected to line 152, while the other end of resistor 206 is connected to ground. The value of resistor 204 is three times the value of resistor 206, thus forming a ¼ voltage divider of the voltage $V_{MN}$ on line 152, which is seen by the common port of switch 198.

Thus, the voltage difference between lines 150 and 152 is sampled, at a level proportionally reduced by the same factor, namely ¼, that the voltage comparison is made at the input of comparator 158.

The DRIVE position port of switch 198 is connected to the common port of a switch 208. A MINUS position port of switch 208 is connected to ground through line 210, while a FLOAT OR PLUS position port is connected to a MINUS port of a switch 212 and to a PLUS input of a differential amplifier 214. The other switch position port of switch 212, a FLOAT OR PLUS position port, is connected to ground. The common port of switch 212 is connected to one port of a capacitor 216. The other port of capacitor 216 is connected to the common port of a switch 218. A DRIVE port of switch 218 is connected to a DRIVE port of switch 196. A SAMPLE port of switch 218 is connected to the output of DAC 176, i.e., to line 182. An intermediate, OFF position of switch 218 floats.

The output of differential amplifier 214 is provided to the gate of an NMOS device 220. The source of device 220 is connected to a MINUS input of differential amplifier 214 and to one port of a resistor 222, the other port of which is connected to ground. The drain of device 220 is connected to an input of a current mirror 224 of conventional design. The output of current mirror 224 is connected to the common port of a switch 226. The current at the input of current mirror 224 is determined by the value of $V_{CMD}$ and by the value R of resistor 222. Thus, the input current of current mirror 224 is equal to $V_{CMD}/R$. Now, it is desired in the circuit 200 to have a transconductance of 2, such that the output drive currents DRV+ and DRV− conform to the relationship:

$$DRV+/-=2V_{CMD} \qquad (1)$$

This is accomplished by selecting R, and a current amplification factor such that:

$$DRV+/-= \left[\frac{V_{CMD}}{R} \times A_{cm2}\right] \times A_{cm1}, \qquad \text{Eq. (2)}$$

where $A_{cm1}$ is a current amplification provided by current mirror 224, and $A_{cm2}$ is a current amplification provided by each of the current mirror pairs 228, 230 and 242, 244. In an exemplary implementation of circuit 200, the value R is the same value R of the resistive dividers described above (160, 162; 154, 156; 200, 202; 204, 206), and is 1 KΩ. Current mirror 224 provides a four times current amplification. In addition, a multiplication by 500 is provided by each of the current mirror pairs 228, 230 and 242, 244. This is accomplished by fabricating devices 230 and 244 to be 500 times the widths of devices 228 and 242. Substituting these values into Eq. (2) shows that Eq. (1) is satisfied:

$$DRV+/-= \left[\frac{V_{CMD}}{1,000} \times 500\right] \times 4 = 2V_{CMD}. \qquad \text{Eq. (3)}$$

A MINUS port of switch 226 is connected to the drain and to the gate of an NFET device 228, and to the gate of an NFET device 230. The source of NFET device 230 is connected to ground.

The drain of NFET device 230 is connected to the DRV+ output line 150, to the source of a large current NFET 236, one of two "high side drivers." The drain of NFET device 236 is connected to the actuator voltage supply $V_M$. The gate of NFET device 236 is connected to the output of an AND gate 240. One input of AND gate 240 is connected to the PLUS signal line 190, while the other input of AND gate 240 is connected to the $\overline{\text{FLOAT}}$ signal line 188.

A FLOAT OR PLUS port of switch 226 is connected to the drain and to the gate of an NFET device 242, and to the gate of an NFET device 244. The source of NFET device 244 is connected to ground.

The drain of NFET device 244 is connected to the DRV− output line 152, to the source of a high current NFET 250, the other of the two "high side drivers." The drain of NFET device 250 is connected to the actuator voltage supply $V_M$. The gate of NFET device 250 is connected to the output of an AND gate 254. One input of AND gate 254 is connected to the MINUS signal line 192, while the other input of AND gate 254 is connected to the $\overline{\text{FLOAT}}$ signal line 188.

The power supply for AND gate 240 and AND gate 254 is a boosted voltage supply $V_B$. This supply may have its voltage boosted using a conventional voltage boosting circuit, such as a charge multiplier. For example, if the actuator voltage supply $V_M$ is, at least at the start of a loss in power, say, 5 volts, then the boosted voltage $V_B$ may be, for example, 20 volts. This higher voltage ensures that the output signals of AND gate 240 and AND gate 254 are sufficiently high to drive their associated NFET devices 236 and 250, respectively, to a fully saturated ON state, even as the system supply voltage decays after a power failure.

A retract enable signal enables gates 240 and 254 through negative logic. Thus, $\overline{\text{RETEN}}$ is applied to an inverting enable port of AND gate 240 and AND gate 254.

The pair of devices 228 and 230 form a current mirror, mirroring the current at the output of current mirror 224, when switch 226 is in the MINUS position. Current is provided to the pair by device 250, enabled by AND gate 254 during the MINUS pulse, provided the $\overline{\text{FLOAT}}$ signal is high, and the $\overline{\text{RETEN}}$ signal is low.

It will be appreciated from the above discussion that active drive current is provided through the actuator, through either line 150 or line 152, as the case may be, as either device 236 is on and device 250 is off, or device 250 is on and device 236 is off. This provides two selectable drive directions to the actuator member.

The pair of devices 242 and 244 form a current mirror, mirroring the current at the output of current mirror 224 when switch 226 is in the FLOAT OR PLUS position. Current is provided to the pair by device 236, enabled by AND gate 240 during the PLUS pulse, provided the $\overline{\text{FLOAT}}$ signal is high, and the $\overline{\text{RETEN}}$ signal is low.

Referring again to the signal diagram of FIG. 5, the principles operation of the circuit of FIG. 6 will now be described. As described above, the voltage difference between the DRV+ line 150 and the DRV− line 152, i.e., $V_{MP}-V_{MN}$, is monitored at the inputs of comparator 158 to indicate whether $V_{MP}$ is at least 4•$V_{RET}$ above $V_{MN}$. The output of comparator 158 is stored in latch 166 in response to the SAMPLE signal. Thus, the voltage difference $V_{MP}-V_{MN}$ setting the UP or DOWN count in counter 170 is taken after the drive current to the actuator has been interrupted by the FLOAT signal, and thus the voltage difference substantially represents the speed of the actuator member. As an example, the FLOAT pulse may be provided at a period of 1.5 milliseconds, and may have a duration (130–136 in FIG. 5) of 290 μsec, with the SAMPLE signal being provided for a duration (132–134 in FIG. 5) of 24 μsec, and its rising edge occurring 242 μsec after the rising edge of the FLOAT pulse (130–132 in FIG. 5).

Note that this results in a 24 tsec delay after the falling edge of the SAMPLE pulse before the FLOAT pulse falling edge (134–136 in FIG. 5). This delay ensures that the respective switches (FETs) enabling the voltage capture on capacitors 194 and 216 have completely turned off before the captured voltages are sampled. Note also that a 24 μsec delay after the falling edge of the FLOAT pulse is provided, before the rising edge of the next DRIVE pulse (136–138 in FIG. 5). This effects the OFF position of switch 218, and ensures that the other switches have completed their transitions, so that charge is not inadvertently shunted to ground at the transition to the next DRIVE pulse, resulting in control error.

It will be appreciated that capacitor 194 could sample $V_{MP}-V_{MN}$ at a rate different from the rate at which latch 166 captures its input. Likewise, the rate at which up/down counter 170 counts could be different than the rate at which latch 166 captures its input, and than the rate at which capacitor 194 samples $V_{MP}-V_{MN}$. However, using a common sample rate simplifies the design. Important is that the sampling of $V_{MP}-V_{MN}$ be done after the DRV+ and DRV− output currents have been interrupted, so that only the back-EMF is sensed or sampled, as the case may be.

Latch 166 has its Q output state set to high if $V_{MP}-V_{MN}$ is greater than 4•$V_{RET}$, commanding a DOWN count to up/down counter 170, while its Q output state is set to low if $V_{MP}-V_{MN}$ is less than $4 \cdot V_{RET}$, commanding an UP count to up/down counter 170. In this way, the up/down counter 170 is commanded to provide a count to DAC 176 causing DAC 176 to provide an output voltage that decreases incrementally if $V_{MP}$ is too high, and increases incrementally if VMP is too low. In this way, DAC 176 commands a voltage that is incrementally corrected to drive the speed of the actuator member to the speed represented by $V_{RET}$ at the output of DAC 176.

Note that below, when voltage differences $V_{MP}-V_{MN}$ between the actuator supply lines 150 and 152 are described, "positive" is used to describe the condition where the back-EMF voltage is greater than $4 \cdot V_{RET}$, i.e., the actuator member is going too fast, while "negative" is used to describe the condition where the back-EMF voltage is less than $4 \cdot V_{RET}$, i.e., the actuator member is going too slowly in the direction of the parking stop, or moving away from the parking stop.

Now, the operation may be fully explained with respect to three situations. Situation 1 occurs when $V_{MP}$ is greater than $V_{MN}$, and represents an actuator member speed that is higher than the target speed. Situation 2 occurs when $V_{MP}$ is greater than $V_{MN}$, but and represents an actuator member speed that is lower than the target speed. Situation 3 occurs when $V_{MP}$ is less than $V_{MN}$, which represents an actuator movement in the opposite direction to that desired for the retract. In all situations, the commanded current corresponds to the command voltage $V_{CMD}$, which may be expressed as shown in Equation (4):

$$V_{CMD} = +/- \left[ V_{RET} + V_{INT} - \left( \frac{V_{MP} - V_{MN}}{4} \right) \right], \quad \text{Eq. (4)}$$

where the +/− sign preceding the right-hand term is determined by whether PLUS or MINUS is active, respectively, as will be clear from the discussion that follows.

In situation 1, the output comparator 158 is high, latching a DOWN count command in latch 166. However, the initial state of counter 170 is zero. As a result, latch 186, which has an initial state of PLUS, is changed to a state of MINUS at the end of the next FLOAT pulse. In response, switches 208, 212 and 226 all change to the MINUS position. This also enables high side driver device 250, which applies a driving current to the DRV− line 152 tending to slow the member, and thus reduce the value of $V_{MP}-V_{MN}$. The value of that current is determined by the voltage $V_{CMD}$ at the input of the differential amplifier 214. Using Equation (4), $V_{CMD}$ is, because of the state of switches 208 and 212, equal to $$-\left[ V_{RET} + V_{INT} - \left( \frac{V_{MP} - V_{MN}}{4} \right) \right].$$

Because of the negative sign preceding the above expression, the factor $$-\left( \frac{V_{MP} - V_{MN}}{4} \right)$$

is additive to the correction current. Thus, higher excessive speeds tend to cause higher correction currents, and vice versa, as is desired.

The counter 170, being at a count of zero, cannot count lower, and so integral compensation $V_{INT}$ is not provided in this direction, i.e., it is zero in Equation (4). However, the proportional compensation is adequate to provide any large corrections that may be needed initially. And, integral compensation is provided when the counter is at count values above zero, ensuring adequate long term compensation for the system as a whole.

In situation 2, the output comparator 158 is low, latching an UP count command in latch 166. Latch 186 retains its initial PLUS state. Consequently, switches 208, 212 and 226 all remain in the PLUS position. This also enables high side driver device 236, which applies a driving current to the DRV+ line 150 tending to increase the speed of the member, and thus increase the value of $V_{MP}-V_{MN}$. The value of that current is determined by the voltage $V_{CMD}$ at the input of the differential amplifier 214. Using Equation (4), $V_{CMD}$ is, because of the state of switches 208 and 212, equal to $$+\left[ V_{RET} + V_{INT} - \left( \frac{V_{MP} - V_{MN}}{4} \right) \right].$$

Because of the positive sign preceding the above term, the factor $$-\left( \frac{V_{MP} - V_{MN}}{4} \right)$$

is subtractive to the correction current. However, since it is a small factor, as compared with $V_{RET}+V_{INT}$, the overall correction current commanded is appropriate to tend to return the actuator member to the proper speed. Note that in situation 2 the counter 170 is counting UP, and so an increasing integral compensation voltage $V_{INT}$ is being provided (via DAC 176 and capacitor 216).

In situation 3, the output comparator 158 is again low, as in situation 2, and all of the foregoing discussion applies. However, since the factor $$-\left( \frac{V_{MP} - V_{MN}}{4} \right)$$

is now positive, the higher the amount by which $V_{MN}$ is larger than $V_{MP}$, i.e., the faster the actuator member is going in the wrong direction, the higher the compensating correction current commanded, as is desired.

Although the present invention and its advantages have been described in detail, it should be understood that various changes, substitutions and alterations can be made herein without departing from the spirit and scope of the invention as defined by the appended claims.

What is claimed is:

1. An apparatus for controlling an actuator having a moveable member and having a coil that influences movement of the member, by provision of a drive current to said coil in response to a target speed voltage signal, comprising:

an up/down counter, counting at a predetermined count rate and providing a count output;

a control unit for controlling the direction of count of said up/down counter depending on whether the voltage across said coil, sensed periodically a first predetermined interval after said drive current to said coil is interrupted, is greater than, or less than, a reference voltage having a predetermined relationship to said target speed voltage;

a digital-to-analog converter responsive to said count output to provide a compensated voltage signal having a voltage corresponding to said count output;

a voltage sensing and holding unit that periodically, after said drive current is interrupted for a second predetermined interval, senses and holds a sample voltage corresponding to the voltage across said coil;

a plus/minus indicator that senses when said up/down counter is in a down count direction and is at a count of zero, and in response thereto changes between a plus state and a minus state;

a switch node combining said sample voltage signal with said compensated voltage signal to produce a command voltage signal, and providing said command voltage signal with a polarity controlled by the state of said plus/minus indicator; and a transconductance amplifier unit, receiving said command voltage signal and providing said drive current to said coil in a direction determined by the state of said plus/minus indicator.

2. An apparatus according to claim 1 wherein said reference voltage is substantially the same as said target speed voltage.

3. An apparatus according to claim 1 wherein said reference voltage is a predetermined fraction of said target speed voltage.

4. An apparatus according to claim 1 wherein said compensated voltage is at a level of a converted voltage, corresponding directly to said up/down counter output, plus said reference voltage.

5. An apparatus according to claim 1 wherein said first predetermined interval is substantially the same as said second predetermined interval.

6. An apparatus according to claim 1 wherein said voltage sensing and holding unit comprises a capacitor.

7. An apparatus according to claim 1 wherein said voltage sensing and holding unit comprises a capacitor having its ports coupled to said coil by way of voltage dividers.

8. An apparatus according to claim 1 wherein said predetermined count rate is substantially the rate at which said drive current is interrupted periodically.

9. An apparatus for controlling an actuator in response to a target speed voltage signal, said actuator having a moveable member and having a coil that influences movement of the member, comprising:

a sample pulse generator for generating regularly occurring sample pulses;

a voltage sense unit for sensing the actuator voltage across said coil and providing a direction signal indicating whether the voltage across said coil is greater than, or less than, a reference voltage having a predetermined relationship to said target speed voltage;

an up/down counter responsive to said sample pulses, counting at the rate of said sample pulses, counting either up or down under control of said direction signal, and providing a count output;

a digital-to-analog converter responsive to said count output to provide a compensated voltage signal having a voltage corresponding to said up/down counter output;

a voltage sensing and holding unit that senses the voltage across said coil in response to said sampling signal and holds said sensed voltage as a signal;

a plus/minus indicator providing a plus/minus output signal that switches between an indication of plus and minus in response to detecting that said up/down counter is counting down and that said up/d own counter has reached a count of zero;

a switch for adding said sensed voltage signal to said compensated voltage signal to produce a command voltage signal, and providing said command voltage signal with a polarity controlled by the state of said plus/minus indicator; and a transconductance amplifier, receiving said command voltage signal and providing a drive output signal having a current magnitude that has a predetermined relationship to the voltage level of said command voltage signal, said drive output signal being for connection across said coil in a direction determined by said plus/minus indicator output signal.

10. An apparatus for controlling an actuator in response to a target speed voltage signal, said actuator having a moveable member and having a coil that influences movement of the member, comprising:

a sample pulse generator for generating regularly occurring sample pulses;

a voltage sense unit for sensing the voltage across said coil and providing a direction signal indicating whether said coil voltage is greater than, or less than, a reference voltage having a predetermined relationship to said target speed voltage;

an up/down counter responsive to said sample pulses, counting at the rate of said sample pulses, and counting either up or down under control of said direction signal;

a digital-to-analog converter responsive to the output of said up/down counter to provide a compensated voltage signal having a voltage corresponding to said up/down counter output;

a voltage sensing and holding unit that senses the voltage across said coil in response to said sampling signal and holds said sensed voltage;

a plus/minus indicator providing an plus/minus signal that switches between an indication of plus and minus in response to detecting that said up/down counter is counting down and that said up/down counter has reached a count of zero;

a first switch, responsive to said voltage sensing and holding unit and to said digital-to-analog converter for adding said sensed voltage signal to said compensated voltage signal to produce a command voltage signal, and providing said command voltage signal with a polarity controlled by said plus/minus signal;

a transconductance amplifier, receiving said command voltage signal and providing a drive signal having a current magnitude that has a predetermined relationship to the voltage level of said voltage command signal; and a second switch, providing said drive signal to said coil in a direction determined by said plus/minus indicator output signal.

* * * * *